Sept. 12, 1961 V. S. FIRESTONE 2,999,715
VACUUM RELEASE APPARATUS
Filed Sept. 18, 1959
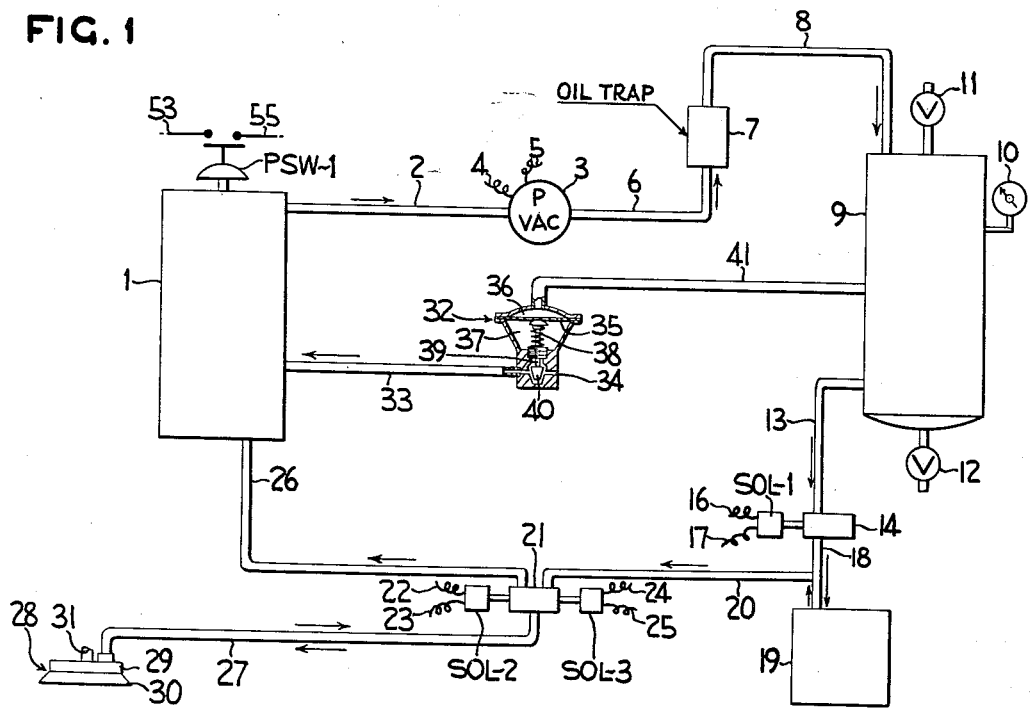
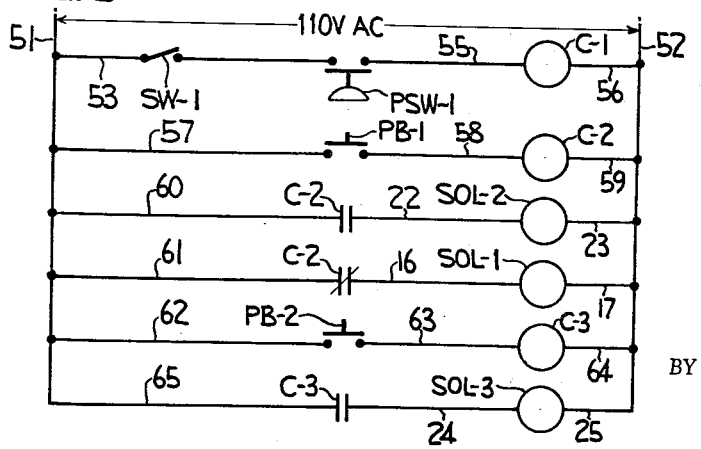
INVENTOR.
VANCE S. FIRESTONE
BY
Oscar L. Spencer
ATTORNEY

United States Patent Office 2,999,715
Patented Sept. 12, 1961

2,999,715
VACUUM RELEASE APPARATUS
Vance S. Firestone, Ford City, Pa., assignor to Pittsburgh Plate Glass Company, a corporation of Pennsylvania
Filed Sept. 18, 1959, Ser. No. 840,877
5 Claims. (Cl. 294—64)

This invention relates to a vacuum release apparatus and more particularly relates to an apparatus for providing selectively a vacuum and compressed air for release of the vacuum to a device, such as a vacuum cup or a set of vacuum cups for suction lifting of glass sheets.

In the lifting of glass sheets it is common to use a vacuum cup or a frame containing a number of vacuum cups. This cup or these cups are connected to a vacuum source after the cup or cups are brought against the surface of the sheet. With the vacuum thus created between the cup or cups it is possible to lift the sheet by lifting the cup or cups. To disengage the lifting device it is necessary to release the vacuum. This is customarily done by constructing the lifting device to place the cup or cups in communication with compressed air for a quick release of the vacuum. The compressed air is provided by a tank fed by a compressor. When the pressure in this tank falls below a specified value the compressor is operated to build up the pressure in the tank. Similarly the vacuum tank is maintained at a pressure substantially below atmospheric pressure by a vacuum pump and, when this pressure exceeds a certain value, the vacuum pump is operated to restore the desired vacuum in the vacuum tank.

It is an object of the present invention to provide an apparatus in which the compressed air from a vacuum pump connected to the vacuum tank can be utilized to provide a quick release of the vacuum in the cup or cups.

It is a further object of this invention to provide a means of replenishing the compressed air in a pressure tank automatically through a control system that uses the pressure control system of the vacuum tank for initiation of the vacuum pump.

These and other objects of the present invention will be apparent from the description, which follows, of the preferred embodiment of the invention taken in conjunction with the drawings in which:

FIG. 1 represents diagrammatically the apparatus of the present invention connected to a vacuum cup; and
FIG. 2 is a schematic electrical diagram.

Referring to FIG. 1, a vacuum tank 1 is connected by conduit 2 to an inlet of a vacuum pump 3 operated by wires 4 and 5 connected to an electrical source (not shown). The outlet of vacuum pump 3 is connected by pipe 6, oil trap 7 and pipe 8 to a pressure tank 9. The pressure tank 9 has a pressure gauge 10, a safety valve 11 and a drain valve 12.

A pipe 13 connects tank 9 to an inlet of a solenoid-operated 2-way valve 14 having a solenoid SOL-1 energized through wires 16 and 17 connected to it. The outlet of valve 14 is connected by pipe 18 to a smaller pressure tank 19 having preferably a maximum volumetric capacity of about 30 percent of that of tank 9.

A pipe 20 is connected to tank 19 through pipe 18. The pipe 20 is connected to a first inlet of a 3-way double-solenoid valve 21 having solenoids SOL-2 and SOL-3. The solenoid SOL-2 is connected by wires 22 and 23 to a 110-volt A.C. electrical power source in the manner shown in FIG. 2. Similarly solenoid SOL-3 is connected by wires 24 and 25 to the 110-volt A.C. electrical power source. A pipe 26 communicates a second inlet of valve 21 with tank 1. The outlet of valve 21 is connected by pipe 27 to a vacuum cup generally indicated at 28. Only one vacuum cup 28 is shown but obviously pipe 27 can be connected to a number of vacuum cups 28, mounted on a frame, through a manifold system (not shown).

The vacuum cup 28 includes a base 29 on which is mounted a rubber skirt 30. The pipe 27 is connected to vacuum cup 28 for communication with an aperture extending through base 29. The cup 28 has a handle 31.

A diaphragm-operated valve generally indicated at 32 has its outlet connected to a pipe 33 in communication with tank 1. The inlet 34 of valve 32 is open to the atmosphere. A diaphragm 35 of valve 32 separates a large chamber of valve 32 into two smaller chambers 36 and 37. A spring 38 biases upwardly a stem 39 of plug 40 of valve 32. A pipe 41 connects tank 9 and the upper chamber 36 of valve 32. The chamber 37 is at atmospheric pressure as is chamber 36 initially. When the pressure in chamber 36 exceeds that of chamber 37 through an increase in pressure of tank 9, diaphragm 36 bows downwardly against the enlarged head of stem 39 to move plug 40 downwardly into closing position, thereby stopping flow of air from inlet 34 through valve 32 to pipe 33.

In the illustrative embodiment valve 14 is normally closed but is opened by the energization of solenoid SOL-1. The valve 21 in the illustrative embodiment is of the balanced type so that the momentary energization of solenoid SOL-2 moves its plunger or spool from a first position to a second position where it remains. The momentary energization of solenoid SOL-3 moves it from the second position to the first position where it remains until the subsequent energization of solenoid SOL-2. In the diagrammatic representation of FIG. 1 the momentary energization of solenoid SOL-2 operates valve 21 so that pipes 26 and 27 are in communication whereas the momentary energization of solenoid SOL-3 places the pipes 20 and 27 in communication with each other.

Referring to FIG. 2, wires 51 and 52 are connected to a 110-volt A.C. electrical power source. A number of parallel circuits connects wires 51 and 52. One of these circuits includes in series a wire 53, a switch SW-1, a pressure-responsive switch PSW-1, a wire 55, a coil C-1 of a relay (not shown) and a wire 56. The switch PSW-1 is normally open and closes only when air pressure against the switch reaches a pressure that is above the desired pressure for vacuum tank 1. The energization of coil C-1 of a relay closes normally open contacts (not shown) in series with wires 4 and 5 to operate the motor of pump 3.

Another parallel circuit includes in series a wire 57, a push-button switch PB-1, a wire 58, a coil C-2 of a relay (not shown), and a wire 59. The relay having coil C-2 has a normally open contact C-2 and a normally closed contact C-2 which are in separate parallel circuits between wires 51 and 52. The normally open contact C-2 is in series with a wire 60, wire 22, solenoid SOL-2 and wire 23. The normally closed contact C-2 is in series with a wire 61, wire 16, solenoid SOL-1 and wire 17.

Another parallel circuit has in series a wire 62, a push-button switch PB-2, a wire 63, a coil C-3 of a relay (not shown) and a wire 64. The relay having coil C-3 has a normally open contact C-3 which is in another parallel circuit in series with a wire 65, wire 24, solenoid SOL-3 and wire 25.

*Operation*

With the preferred embodiment of the apparatus as described above tank 1 is evacuated and compressed air is placed in tank 9 in the following manner. The valve 32 is open, because tank 9 is at atmospheric pressure, so that tank 1 is in communication with the atmosphere. Because the air pressure in tank 1 is atmospheric, pressure switch PSW-1 is already closed. An operator closes switch SW-1, to energize coil C-1 which closes contacts in series with wire 4 and 5 to start the motor of vacuum pump 3. Air is pumped from tank 1 through pipe 2, pump 3, pipe 6, trap 7, pipe 8 into tank 9. Air in tank 1 is replaced by air passing through open valve 32 and pipe 33.

When sufficient air is pumped in tank 9 to a predetermined pressure in tank 9, e.g. 5 lbs. per sq. inch gage, through pipe 41 the same pressure is established in chamber 36. Valve 32 is constructed or adjusted so that this pressure differential between chambers 36 and 37 sufficiently bows diaphragm 35 to close valve 32 by downward movement of plug 40. This stops communication of tank 1 with the atmosphere. At this point tank 1 contains air at atmospheric pressure so that pressure-responsive switch PSW–1 remains closed. The pump 3 continues to operate, removing air from tank 1 and pumping it into tank 9. The pressure in tank 9 can be measured by gage 10. If the pressure exceeds a safe value, the pressure is automatically released by safety valve 11. When the vacuum pump 3 has reduced the air pressure in tank 1, after the closing of valve 32, to the desired vacuum in tank 1 the pressure-responsive switch PSW–1 opens, thereby deenergizing coil C–1 and pump 3 stops. Of course, valve 21 has its outlet communicating with the inlet connected to pipe 20; otherwise, through pipe 20 and the first inlet of valve 21 tank 1 would communicate at all time with the atmosphere through pipe 27 connected to vacuum cup 28.

To pick up a glass sheet, vacuum cup 28 is moved against the sheet. An operator then closes a push-button switch PB–1 to energize coil C–2, thereby closing normally open contact C–2 and opening normally closed contact C–2. This results in the energization of solenoid SOL–2 and the deenergization of solenoid SOL–1. Pipe 27 now communicates through pipe 26 with tank 1. The deenergization of solenoid SOL–1 opens valve to communicate tank 9 with tank 19. Although valve 21 requires only momentary energization of solenoid SOL–2 to initiate communication of tank 1 with vacuum cup 28, the release of switch PB–1 by the operator closes valve 14. During the brief interval that switch PB–1 is closed sufficiently large pipes 13 and 18 permit a rapid buildup of compressed air in tank 19 from tank 9.

When it is desired to release cup 28, an operator closes a push-button switch PB–2 to energize coil C–3 for the closing of contact C–3 to energize solenoid SOL–3. This stops communication between tank 1 and cup 28 and communicates pipe 20 with pipe 27. Compressed air from tank 19 rapidly moves into cup 28 for the release of the vacuum.

Each time that the operator wishes to lift a glass sheet the foregoing process is carried out. Each cycle of operation will deplete part of the compressed air in tank 9. When the pressure of tank 9 is sufficiently low, valve 32 opens to admit air into tank 1. Of course, each time that cup 28 communicates with tank 1 the pressure in tank rises. This can close switch PSW–1 to operate pump 3. In any event, the opening of valve 32 increases the pressure in tank 1 to start pump 3 if not already operating. The pump 3 continues to pump air to tank 9. When the pressure in chamber 36 reaches the value by which diaphragm 35 bows sufficiently it closes valve 32. The pump 3 continues to evacuate tank 1 until its pressure is sufficiently low to open switch PSW–1. This stops pump 3.

It is thus seen that pump 3 serves a dual purpose of providing a vacuum source in tank 1 and providing a compressed air source in tank 9. The operation of the pump is under the control of the pressure in the vacuum tank. The replenishment of compressed air is provided by increasing automatically the pressure in the vacuum tank to operate the automatic control of the vacuum pump which is dependent upon this pressure in the vacuum tank. This replenishment is accomplished by valve 32 which is responsive to air pressure in tank 9.

The tank 19 serves as a small blast tank, that is, it provides a small amount of compressed air for vacuum release without loss of the entire compressed air source in any single vacuum release operation. In the present invention the communication between tanks 9 and 19 is not provided during the utilization of compressed air in tank 19. Furthermore, during the buildup of vacuum in tank 1 and pressure in tank 9, pipe 27 communicates with tank 19 so that the arrangement must insure that tank 19 and tank 9 do not communicate during this period of operation.

Various modifications of the present invention will be apparent to one skilled in the art from the description of the preferred embodiment which has been presented above for purpose of illustration only. For example, the 3-way valve 21 permits the utilization of a single pipe to a vacuum lifting device, whereas conventional arrangements have required separate pipes for compressed air and vacuum to the lifting device as is apparent in the device shown in U.S. Patent No. 2,783,018. The more cumbersome arrangement could be utilized by substituting 2-way valves for valve 21 with one valve controlling communication between tank 1 and cup 28 and the other valve controlling communication between cup 28 and tank 19. In this case a suitable interlock control should be utilized to insure that one of the 2-way valves is closed while the other is open and vice versa. In addition, modifications could include the use of separate push buttons for the opening of valve 14 during the opening of a valve communicating tank 1 and cup 28. The invention is limited only by the claims which follow.

I claim:

1. An apparatus for providing a source of vacuum and a source of compressed air which comprises a pressure tank, a vacuum tank, a power-operated vacuum pump having an inlet and an outlet, conduit means communicating the vacuum tank to the inlet of the vacuum pump for evacuation of the vacuum tank, conduit means communicating the pressure tank to the outlet of the vacuum pump during communication of said vacuum tank with said inlet of the vacuum pump provided by said first-mentioned conduit means, valved conduit means communicating said vacuum tank with the atmosphere and communicating said inlet of said vacuum pump with the atmosphere through said vacuum tank and including a normally open valve, means operatively closing said normally open valve in response to air pressure in the pressure tank, actuated switch means to connect the vacuum pump to a power source upon actuation of the switch means and means responsive to air pressure in the vacuum tank to actuate the switch means.

2. The apparatus of claim 1 wherein the normally open valve is a diaphragm-operated valve having a diaphragm separating a chamber of the valve into two smaller chambers and wherein the means operatively closing said normally open valve in response to air pressure in the pressure tank includes a conduit communicating said pressure tank with one of said smaller chambers of the valve.

3. An apparatus for providing selectively to a device a vacuum and compressed air for release of the vacuum which comprises a pressure tank, a smaller tank, a vacuum tank, a power-operated vacuum pump having an inlet and an outlet, conduit means communicating the vacuum tank to the inlet of the vacuum pump for evacuation of the vacuum tank, conduit means communicating the pressure tank to the outlet of the vacuum pump during communication of said vacuum tank with said inlet of the vacuum pump provided by said first-mentioned conduit means, valved conduit means communicating said vacuum tank with the atmosphere and communicating said inlet of said vacuum pump with the atmosphere through said vacuum tank and including a normally open valve, means operatively closing said normally open valve in response to air pressure in the pressure tank, actuated switch means to connect the vacuum pump to a power source upon actuation of the switch means, means responsive to air pressure in the vacuum tank to actuate the switch means, actuated valved conduit means to communicate selectively said vacuum tank and said smaller tank to a device, valved conduit means including a normally closed valve to provide communication between the pressure tank and the smaller tank and means to open said normally closed valve only during at least part of a period of communication of the vacuum tank to a device through the selectively communicating actuated valved conduit means.

4. The apparatus of claim 3 wherein the normally open valve is a diaphragm-operated valve having a diaphragm separating a chamber of the valve into two smaller chambers and wherein the means operatively closing said normally open valve in response to air pressure in the pressure tank includes a conduit communicating said pressure tank with one of said smaller chambers of the valve.

5. An apparatus for providing selectively to a device a vacuum and compressed air for release of the vacuum which comprises a pressure tank, a smaller tank, a vacuum tank, a power-operated vacuum pump having an inlet and an outlet, conduit means communicating the vacuum tank to the inlet of the vacuum pump for evacuation of the vacuum tank, conduit means communicating the pressure tank to the outlet of the vacuum pump during communication of said vacuum tank with said inlet of the vacuum pump provided by said first-mentioned conduit means, valved conduit means communicating said vacuum tank with the atmosphere and communicating said inlet of said vacuum pump with the atmosphere through said vacuum tank and including a normally open valve, means operatively closing said normally open valve in response to air pressure in the pressure tank, a normally open, pressure-responsive switch to connect the vacuum pump to a power source upon closing of said switch by a predetermined pressure, said pressure-responsive switch being connected to said vacuum tank to close upon the pressure in the vacuum tank reaching said predetermined pressure, a 3-way valve having first and second inlets and an outlet, a conduit communicating the first inlet with the vacuum tank, a conduit communicating the second inlet with the smaller tank, a vacuum cup, a conduit communicating the vacuum cup with the outlet of the 3-way valve, a valved conduit means including a normally closed 2-way valve communicating the pressure tank with the smaller tank, means to operate the 3-way valve for communication between the first inlet and outlet, means to operate the 3-way valve for communication between the second inlet and the outlet, means for opening the 2-way valve, and means for operating simultaneously said operating means to place said first inlet and said outlet in communication and said operating means to open said 2-way valve, whereby said 2-way valve is open only during at least part of the communication of said first inlet with said outlet of the 3-way valve.

References Cited in the file of this patent

UNITED STATES PATENTS

| | | |
|---|---|---|
| 930,989 | Richards | Aug. 10, 1909 |
| 2,783,018 | Lytle | Feb. 26, 1957 |
| 2,812,061 | Pfister | Nov. 5, 1957 |
| 2,874,989 | Reynolds | Feb. 24, 1959 |